US009928538B2

(12) United States Patent
Wan et al.

(10) Patent No.: US 9,928,538 B2
(45) Date of Patent: Mar. 27, 2018

(54) METHOD AND APPARATUS FOR PROCESSING USER INFORMATION

(71) Applicant: Xiaomi Inc., Beijing (CN)

(72) Inventors: Li Wan, Beijing (CN); Wei Dai, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/296,649

(22) Filed: Jun. 5, 2014

(65) Prior Publication Data

US 2015/0032576 A1 Jan. 29, 2015

Related U.S. Application Data

(63) Continuation of application No. PCT/CN2014/072272, filed on Feb. 19, 2014.

(30) Foreign Application Priority Data

Jul. 24, 2013 (CN) .......................... 2013 1 0314178

(51) Int. Cl.
*G06Q 30/00* (2012.01)
*G06Q 30/06* (2012.01)

(52) U.S. Cl.
CPC ................ *G06Q 30/0635* (2013.01)

(58) Field of Classification Search
CPC .......................................... G06Q 30/0635
USPC ..................................... 705/26.81
See application file for complete search history.

(56) References Cited

U.S. PATENT DOCUMENTS

| 6,301,339 | B1* | 10/2001 | Staples | ............... | H04L 12/6418 |
| | | | | | 379/93.01 |
| 7,822,188 | B1* | 10/2010 | Kirchhoff | ............. | H04M 3/436 |
| | | | | | 379/211.02 |
| 2002/0072975 | A1* | 6/2002 | Steele | .................... | G06Q 20/10 |
| | | | | | 705/14.1 |
| 2002/0086660 | A1 | 7/2002 | Sullivan et al. | | |
| 2004/0068518 | A1 | 4/2004 | McDowell | | |
| 2006/0241963 | A1 | 10/2006 | Walker et al. | | |

(Continued)

FOREIGN PATENT DOCUMENTS

| CN | 1497450 | 5/2004 |
| CN | 1502202 | 6/2004 |

(Continued)

OTHER PUBLICATIONS

Office Action for Korean Application No. 10-2015-7013683, mailed from the Korean Intellectual Property Office dated Jan. 13, 2016.

(Continued)

*Primary Examiner* — Jeffrey A. Smith
*Assistant Examiner* — Lalith M Duraisamygurusamy
(74) *Attorney, Agent, or Firm* — Finnegan, Henderson, Farabow, Garrett & Dunner LLP

(57) ABSTRACT

A computer-implemented method for processing user information provided in online ordering, includes receiving an instruction to perform an anonymous process on user information selected from the provided user information; performing, in response to the instruction, an anonymous process on the selected user information, to obtain anonymous information corresponding to the selected user information; and generating an order containing the anonymous information.

10 Claims, 10 Drawing Sheets

(56) References Cited

U.S. PATENT DOCUMENTS

| | | | |
|---|---|---|---|
| 2006/0247982 A1 | 11/2006 | Stolfo et al. | |
| 2006/0274896 A1 | 12/2006 | Livesay | |
| 2007/0184830 A1* | 8/2007 | Sullivan, Jr. | G06Q 20/02 455/426.1 |
| 2007/0260739 A1* | 11/2007 | Buckley | H04L 61/3085 709/230 |
| 2009/0045253 A1* | 2/2009 | Han | G06F 21/31 235/380 |
| 2009/0259560 A1* | 10/2009 | Bachenheimer | G06Q 20/02 705/26.1 |
| 2010/0076880 A1 | 3/2010 | Williams et al. | |
| 2010/0094727 A1* | 4/2010 | Shapiro | G06Q 20/12 705/26.1 |
| 2011/0010563 A1 | 1/2011 | Lee et al. | |
| 2012/0203639 A1* | 8/2012 | Webster | G06Q 30/0269 705/14.66 |
| 2013/0132192 A1* | 5/2013 | Krukowski | G06Q 30/06 705/14.51 |
| 2013/0183949 A1* | 7/2013 | Sulmar | H04L 63/0421 455/415 |
| 2013/0297442 A1* | 11/2013 | Simons | G06Q 30/02 705/26.4 |

FOREIGN PATENT DOCUMENTS

| | | |
|---|---|---|
| CN | 1636213 | 7/2005 |
| CN | 103400276 | 11/2013 |
| JP | 2002-007904 A | 1/2002 |
| JP | 2005-500713 A | 1/2005 |
| JP | 2008-306286 A | 12/2008 |
| KR | 10-2006-0127700 | 12/2006 |
| KR | 10-2008-0017530 | 2/2008 |
| KR | 10-2010-0108964 | 10/2010 |
| RU | 2376635 C2 | 12/2009 |

OTHER PUBLICATIONS

Extended European Search Report of European Patent Application No. 14830197.1 from the European Patent Office, dated Nov. 3, 2016.
Notification on Results of Invention Patentability Check for Russian Application No. 2015125628/08(039901), dated May 25, 2016.
International Search Report of PCT/CN2014/072272, mailed from the State Intellectual Property Office of China dated May 23, 2014.

* cited by examiner

METHOD AND APPARATUS FOR PROCESSING USER INFORMATION

CROSS REFERENCE TO RELATED APPLICATIONS

The present application is a continuation of International Application No. PCT/CN2014/072272, filed Feb. 19, 2014, which claims priority to Chinese Patent Application No. 201310314178.9, filed Jul. 24, 2013, the entire contents of all of which are incorporated herein by reference.

TECHNICAL FIELD

The present disclosure generally relates to the field of electronic commerce and, more particularly, to a method and apparatus for processing user information provided in online ordering.

BACKGROUND

In a conventional electronic transaction with a service provider, a user generally first selects commodities to be purchased online, and then fills in user information, such as the user's name, telephone number, etc., to place an order. The service provider will generate an order based on the user information provided by the user, and provide the order containing the user information directly to a third party, e.g., logistics or a supplier. The third party will deliver the commodities purchased by the user to the user according to the user information in the order. As a result, personal information of the user, such as the user's name and telephone number, is leaked to the third party.

SUMMARY

According to a first aspect of the present disclosure, there is provided a computer-implemented method for processing user information provided in online ordering, comprising: receiving an instruction to perform an anonymous process on user information selected from the provided user information; performing, in response to the instruction, an anonymous process on the selected user information, to obtain anonymous information corresponding to the selected user information; and generating an order containing the anonymous information.

According to a second aspect of the present disclosure, there is provided an apparatus for processing user information provided in online ordering, comprising: a processor; and a storage for storing instructions executable by the processor; wherein the processor is configured to execute the instructions to: receive a process instruction to perform an anonymous process on user information selected from the provided user information; perform, in response to the process instruction, an anonymous process on the selected user information, to obtain anonymous information corresponding to the selected user information; and generate an order containing the obtained anonymous information.

According to a third aspect of the present disclosure, there is provided a non-transitory storage medium having stored therein instructions that, when executed by a processor of an apparatus, cause the apparatus to perform a method for processing user information provided in online ordering, the method comprising: receiving an instruction to perform an anonymous process on user information selected from the provided user information; performing, in response to the instruction, an anonymous process on the selected user information, to obtain anonymous information corresponding to the selected user information; and generating an order containing the obtained anonymous information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
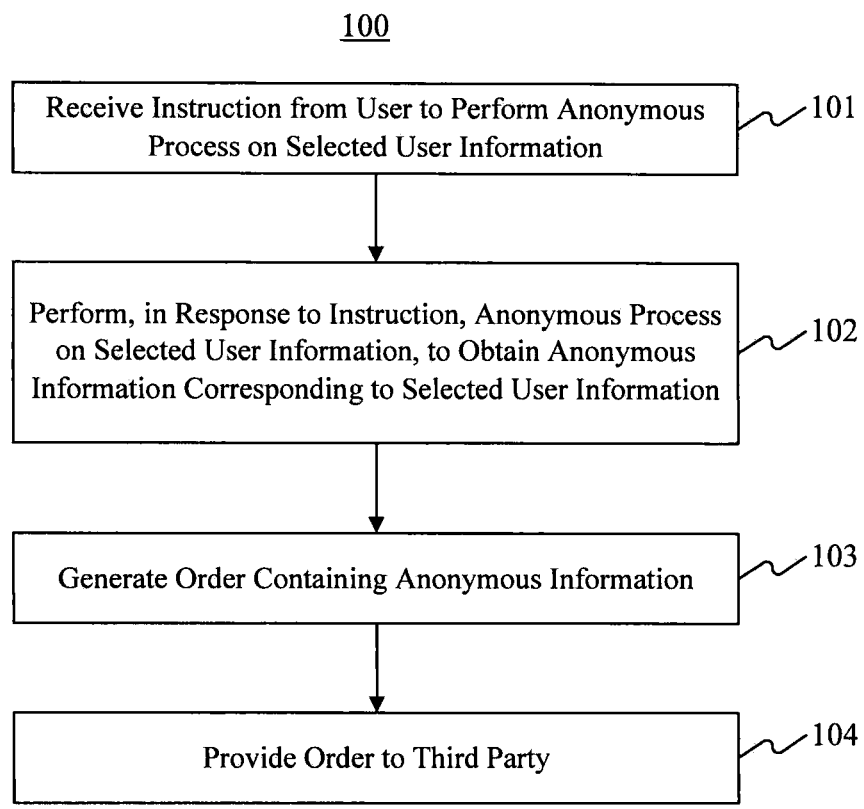
FIG. 1 is a flowchart of a method for an apparatus to process user information provided in online ordering, according to an exemplary embodiment.

FIG. 1 is a flowchart of a method 100 for an apparatus to process user information provided in online ordering, according to an exemplary embodiment. Referring to FIG. 1, the method 100 includes the following steps.

In step 101, the apparatus receives an instruction from a user to perform an anonymous process on selected user information.

In step 102, the apparatus performs, in response to the instruction, an anonymous process on the selected user information, to obtain anonymous information corresponding to the selected user information.

For example, user information includes at least the user's true contact, such as telephone number, true appellation, true address, etc. In the illustrated embodiment, the user may fill in a plurality of pieces of user information for an order, and select one or more of the plurality of pieces of user information on which the anonymous process is to be performed. For example, the user may select the user's true appellation and/or true contact on which the anonymous process is to be performed.

In step 103, the apparatus generates an order containing the anonymous information.

In step 104, the apparatus provides the order to a third party other than the user and a service provider using the apparatus. For example, the third party includes, but is not limited to, logistics, suppliers and so on.

In the method 100, the anonymous information, instead of the user information, is provided to the third party. As a result, the user's personal information will not leak to the third party other than the user and the service provider.

Figure 2:
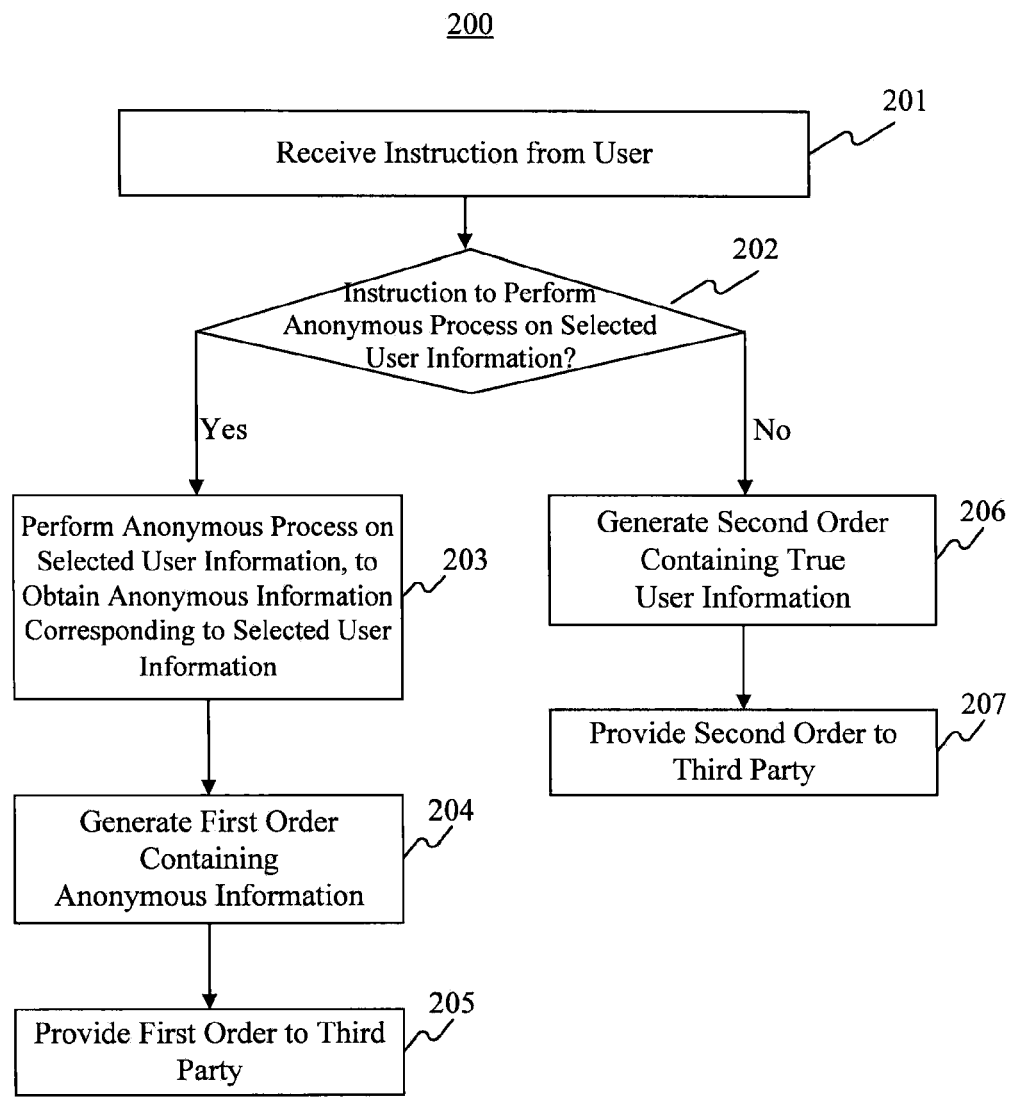
FIG. 2 is a flowchart of a method for an apparatus to process user information provided in online ordering, according to an exemplary embodiment.

FIG. 2 is a flowchart of a method 200 for an apparatus to process user information provided in online ordering, according to an exemplary embodiment. Referring to FIG. 2, the method 200 includes the following steps.

In step 201, the apparatus receives an instruction from a user relating to the user information provided in online order.

In step 202, the apparatus determines if the received instruction is an instruction to perform an anonymous process on selected user information. If it is determined that the received instruction is an instruction to perform the anonymous process, the apparatus performs step 203; otherwise, the apparatus performs step 206.

In the illustrated embodiment, the user fills in the user information after determining the commodities to be purchased on line. After receiving the user information, the apparatus may prompt the user if he needs anonymous receipt of a delivery of the commodities. If the user selects the anonymous receipt, the apparatus receives the instruction to perform the anonymous process. Otherwise, the apparatus receives the instruction to use the user's true information for delivery.

In step 203, the apparatus performs an anonymous process on the selected user information, to obtain anonymous information corresponding to the selected user information.

In exemplary embodiments, user information includes at least the user's true contact, such as telephone number, true appellation, true address, etc. The user may fill in a plurality of pieces of user information for an order, and select one or more of the plurality of pieces of user information on which the anonymous process is to be performed. For example, the user may select the user's true appellation and/or true contact on which the anonymous process is to be performed. In the above embodiments, when the user selects the user's true appellation and true contact to perform the anonymous process, the obtained anonymous information corresponds to the user's virtual appellation and virtual contact. The user's true appellation and true contact, such as the user's name and telephone number, respectively, are used in real life. The user's virtual appellation and virtual contact, which are different from the user's true appellation and true contact, respectively, are used for facilitating the third party to contact the user and, thus, allowing the commodities purchased by the user to be successfully delivered to the user.

In one exemplary embodiment, the true contact is the user's true contact telephone number, which may be a fixed telephone number or a mobile telephone number. Accordingly, the virtual contact is a virtual contact telephone number associated with the true contact telephone number. For example, the virtual contact telephone number may be one or more of a fixed telephone number, a mobile telephone number, or a network telephone number.

In one exemplary embodiment, the true contact is the user's true e-mail address. Accordingly, the virtual contact may be a virtual e-mail address.

In one exemplary embodiment, when the user selects the user's true appellation in the user information for the apparatus to perform the anonymous process on, step 203 includes generating a virtual appellation corresponding to the user's true appellation according to a first preset rule.

In one exemplary embodiment, when the user selects the user's true contact in the user information for the apparatus to perform the anonymous process on, step 203 includes generating a virtual contact corresponding to the user's true contact according to a second preset rule, and associating the virtual contact with the user's true contact.

In exemplary embodiments, the apparatus may include a database to store a plurality of virtual appellations and virtual contacts for selection by the user. To generate the virtual appellation corresponding to the user's true appellation according to the first preset rule, the apparatus arbitrarily selects a virtual appellation from the database as the virtual appellation of the user or, alternatively, selects an unused virtual appellation from the database as the virtual appellation of the user. After selecting the virtual appellation, the apparatus establishes a corresponding relation between the true appellation of the user and the virtual appellation of the user, thereby obtaining the virtual appellation corresponding to the true appellation of the user. One virtual appellation may be simultaneously used by more than one user.

In exemplary embodiments, to generate the virtual contact corresponding to the true contact of the user according to the second preset rule, the apparatus selects an unused virtual contact from the database as the user's virtual contact. Generally, one virtual contact can be used by only one user at one time, and after selecting the user's virtual contact, a corresponding relation between the true contact of the user and the virtual contact of the user is established.

In exemplary embodiments, the database stores a plurality of telephone numbers provided by a device, e.g., a telephone exchange. The device is bound with the plurality of telephone numbers. Accordingly, associating the virtual contact with the true contact may include setting a call forwarding number for the virtual contact telephone number to be the true contact telephone number.

Figure 3:
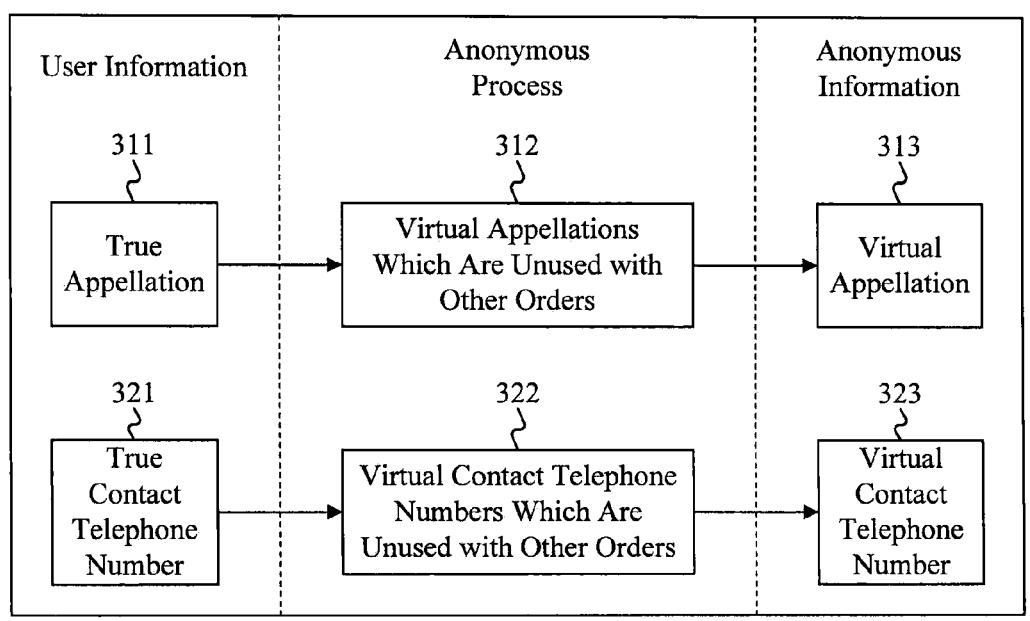
FIG. 3 is a diagram of a method for performing an anonymous process on selected user information, according to an exemplary embodiment.

FIG. 3 is a diagram of a method 300 for the apparatus to perform an anonymous process on selected user information, according to an exemplary embodiment. In the illustrated embodiment, the selected user information includes the user's true appellation 311 and true contact telephone number 321. Referring to FIG. 3, based on the method 300, the apparatus determines the true appellation 311 of the user and then, from one or more virtual appellations 312 which are unused with other orders in the database, selects a virtual appellation 313 as the virtual appellation corresponding to the true appellation 311 of the user. Also based on the method 300, the apparatus determines the true contact telephone number 321 of the user and then, from one or more virtual contact telephone numbers 322 which are unused with other orders in the database, selects a virtual contact telephone number 323 as the virtual contact telephone number corresponding to the true contact telephone number 321 of the user. The apparatus further sets a call forwarding number for the virtual contact telephone number 323 to be the true contact telephone number 321 of the user.

In exemplary embodiments, the virtual contact telephone number may be a fixed telephone number, a mobile telephone number, or a network telephone number. When the virtual contact telephone number is the fixed telephone number or the mobile telephone number, setting the call forwarding number for the virtual contact telephone number to be the true contact telephone number includes sending a call forwarding instruction to the telephone exchange, for the telephone exchange to set the call forwarding number for the virtual contact telephone number to be the true contact telephone number. When the virtual contact telephone number is the network telephone number, setting the call forwarding number for the virtual contact telephone number to be the true contact telephone number includes sending a call forwarding instruction to an instant messenger (IM) server or a voice over Internet protocol (VoIP) server, for the IM server or the VoIP server to set the call forwarding number for the virtual contact telephone number to be the true contact telephone number.

Figure 4:
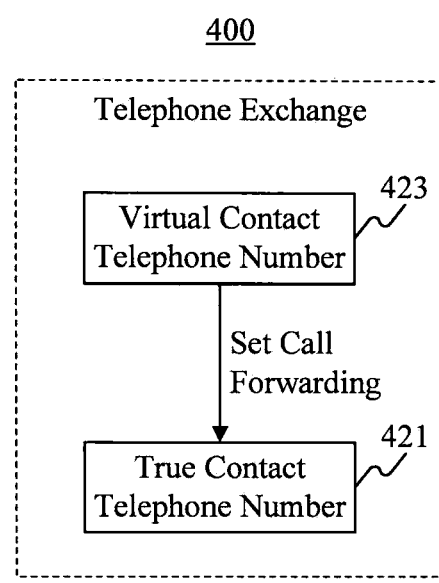
FIG. 4 is a diagram of a method for a telephone exchange to set call forwarding, according to an exemplary embodiment.

FIG. 4 is a diagram of a method 400 for the telephone exchange to set call forwarding, according to an exemplary embodiment. Referring to FIG. 4, when a virtual contact telephone number 423 is a fixed telephone number or a mobile telephone number, the telephone exchange sets the call forwarding for the virtual contact telephone number 423 to be a true contact telephone number 421 of the user.

Figure 5:
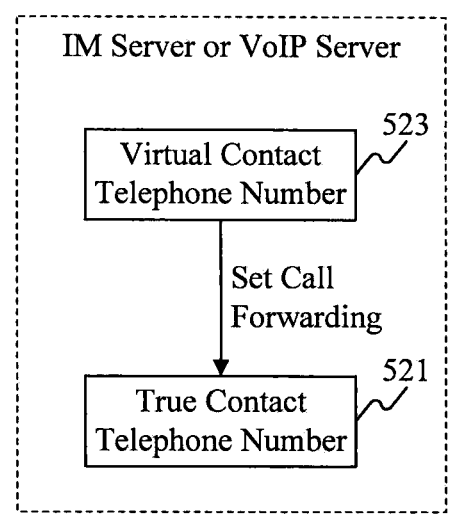
FIG. 5 is a diagram of a method for an instant messenger (IM) server or a voice over Internet protocol (VoIP) server to set call forwarding, according to an exemplary embodiment.

FIG. 5 is a diagram of a method 500 for the IM server or the VoIP server to set call forwarding, according to an exemplary embodiment. Referring to FIG. 5, when a virtual contact telephone number 523 is a network telephone, the IM server or the VoIP server sets the call forwarding of the virtual contact telephone number 523 to be a true contact telephone number 521 of the user.

Referring back to FIG. 2, in step 204, the apparatus generates a first order containing the anonymous information. For example, step 204 may include using the user's virtual appellation, instead of the user's true appellation, in the first order, and using the virtual contact of the user, instead of the user's true contact, in the first order. Accordingly, the anonymous information can be bound with the first order. The first order may also include information on the commodities purchased by the user and delivery address specified by the user.

In step 205, the first order is provided to a third party. The third party can be any party, such as logistics or suppliers, other than the user and the service provider using the method 200. The first order may be an electronic order or a printed order.

In exemplary embodiments, after the third party obtains the first order, if the third party wants to contact the user, the third party may dial the virtual contact telephone number in the first order. When the third party dials the virtual contact telephone number in the first order, the telephone exchange, the IM server, or the VoIP server will automatically forward the call to the true contact telephone number, such that the third party can communicate with the user.

If it is determined that the received instruction is not an instruction to perform the anonymous process, in step 206, the apparatus generates a second order containing true user information. For example, the apparatus uses the user's true appellation and true contact in the second order. In step 207, the second order is provided to the third party.

Figure 6:
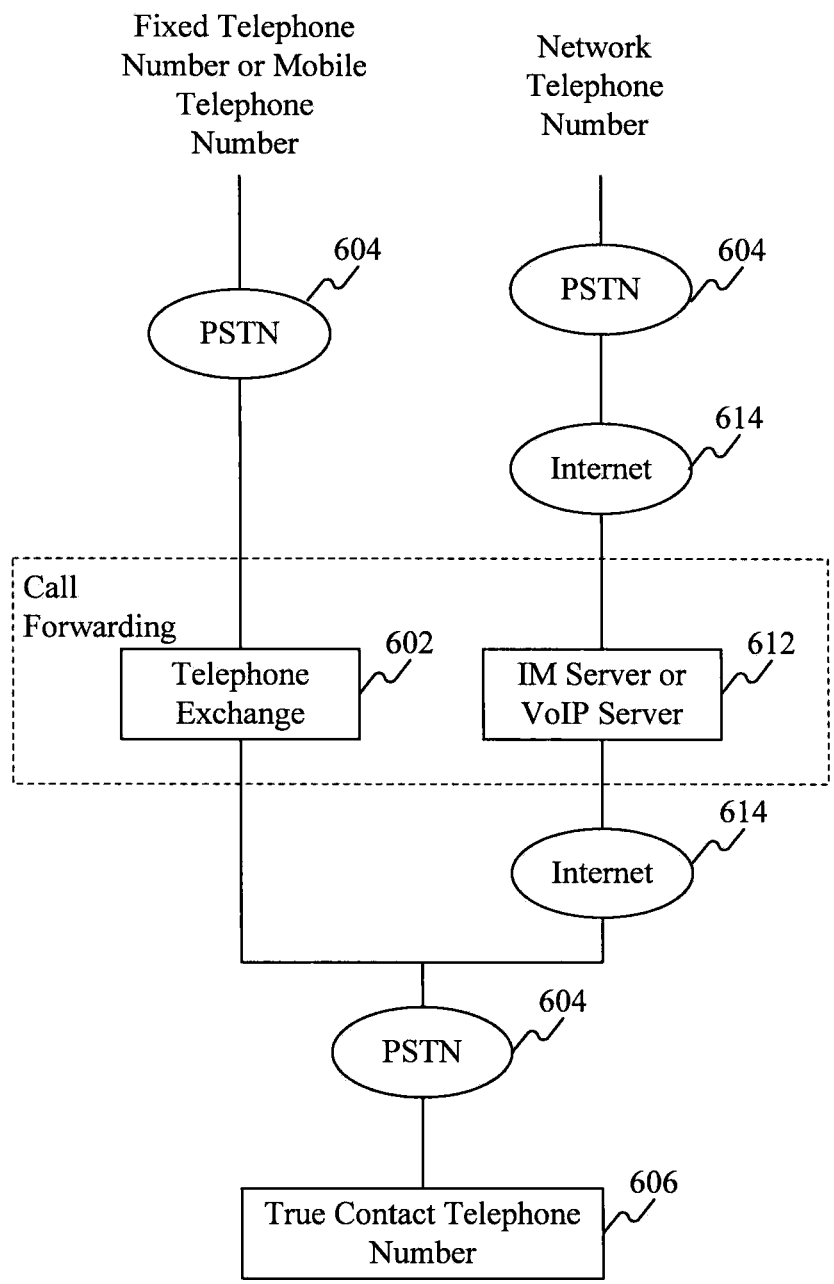
FIG. 6 is a diagram of a method for a third party to communicate with a user through call forwarding, according to an exemplary embodiment.

FIG. 6 is a diagram of a method 600 for the third party to dial the virtual contact telephone number in the first order to communicate with the user, according to an exemplary embodiment. When the virtual contact telephone number is the fixed telephone or the mobile telephone, the call by the third party is connected to a telephone exchange 602 via a public switched telephone network (PSTN) 604, for the telephone exchange 602 to perform a call forwarding to establish a communication with a true contact telephone number 606 via the PSTN 604, such that the third party can communicate with the user. When the virtual contact telephone number is the network telephone number, the call by the third party is connected to the IM server or the VoIP server 612 via the PSTN 604 and Internet 614, for the IM server or the VoIP server 612 to perform a call forwarding to establish communication with the true contact telephone number 604 via the Internet 614 and the PSTN 604, such that the third party can communicate with the user.

In exemplary embodiments, when the apparatus receives a confirmation by the user of a delivery, the apparatus disassociates the virtual contact from the true contact of the user, such that the virtual contact can be used by another user and, thus, resources are saved. When the true contact and the virtual contact are the true contact telephone number and the virtual contact telephone number, respectively, disassociating the virtual contact from the true contact may include cancelling the call forwarding setting of the virtual contact telephone number.

In one exemplary embodiment, when the virtual contact telephone number is the fixed telephone number or the mobile telephone number, cancelling the call forwarding setting of the virtual contact telephone number may include sending an instruction for releasing the call forwarding, for the telephone exchange to cancel the call forwarding setting of the virtual contact telephone number. In one exemplary embodiment, when the virtual contact telephone number is the network telephone number, cancelling the call forwarding setting of the virtual contact telephone number may include sending an instruction for releasing the call forwarding, for the IM server or the VoIP server to cancel the call forwarding setting of the virtual contact telephone number.

Figure 7:
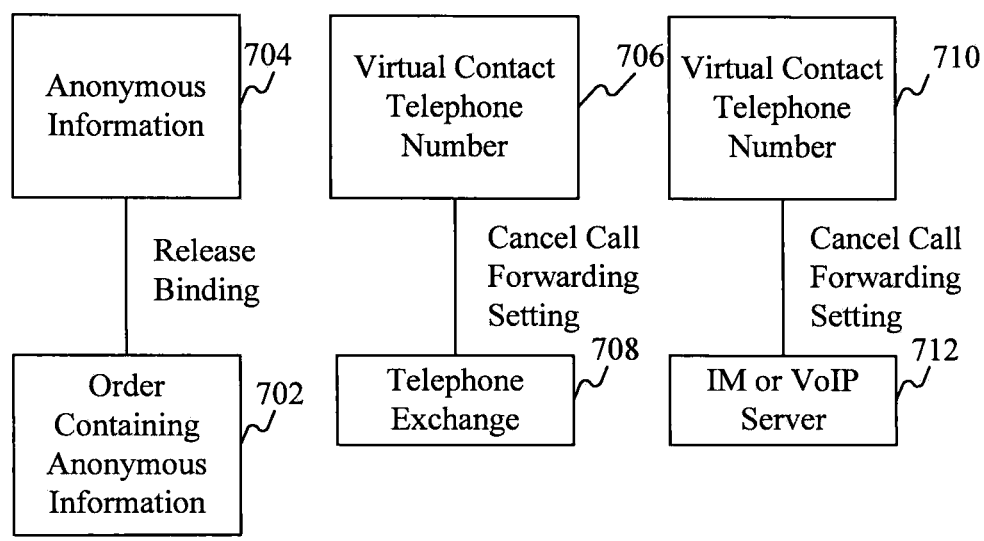
FIG. 7 is a diagram of a method for releasing anonymous information after receiving a confirmation by a user of receiving a delivery, according to an exemplary embodiment.

FIG. 7 is a diagram of a method 700 for releasing anonymous information after receiving a confirmation by the user of receiving a delivery, according to an exemplary embodiment. Referring to FIG. 7, with respect to an order 702 containing anonymous information 704, after receiving the confirmation, the binding of the anonymous information 704 and the order 702 is released. For example, if the anonymous information 704 includes a virtual contact telephone number 706 implemented with a fixed telephone number or a mobile phone number, the call forwarding setting for the virtual contact telephone number 706 is cancelled through a telephone exchange 708. Also for example, if the anonymous information 704 includes a virtual contact telephone number 710 implemented with a network telephone number, the call forwarding setting for the virtual contact telephone number 710 is cancelled through an IM or VoIP server 712.

Figure 8:
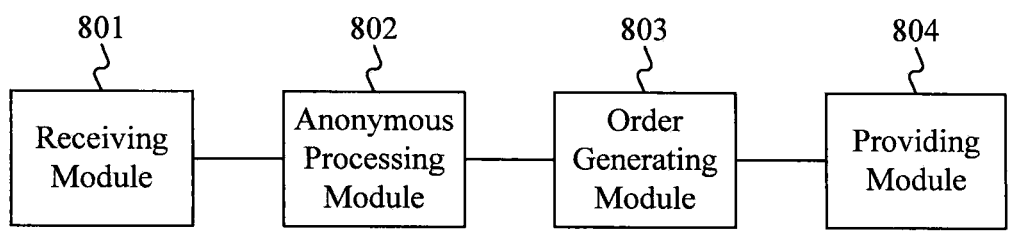
FIG. 8 is a block diagram of an apparatus for processing user information provided in online ordering, according to an exemplary embodiment.

FIG. 8 is a block diagram of an apparatus 800 for processing user information provided in online ordering, according to an exemplary embodiment. Referring to FIG. 8, the apparatus 800 includes a receiving module 801 configured to receive an instruction from a user, an anonymous processing module 802 configured, in response to the instruction, to perform an anonymous process on selected user information, to obtain anonymous information corresponding to the selected user information, an order generating module 803 configured to generate an order containing the anonymous information, and a providing module 804 configured to provide the order to a third party.

By using the apparatus 800, the anonymous information, instead of the true user information, is provided to the third party. As a result, the user's personal information will not leak to the third party.

One of ordinary skill in the art will understand that the above described modules can each be implemented by hardware, or software, a combination of hardware and software. One of ordinary skill in the art will also understand that multiple ones of the above described modules may be combined as one module, and each of the above described modules may be further divided into a plurality of sub-modules.

Figure 9:
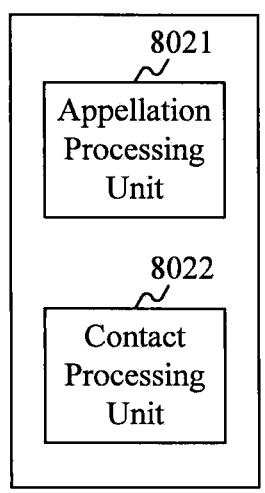
FIG. 9 is a block diagram of an anonymous processing module, according to an exemplary embodiment.

FIG. 9 is a block diagram of the anonymous processing module 802 (FIG. 8), according to an exemplary embodiment. Referring to FIG. 9, the anonymous processing module 802 may include an appellation processing unit 8021 configured to generate a virtual appellation corresponding to the user's true appellation according to a first preset rule; and/or a contact processing unit 8022 configured to generate a virtual contact corresponding to the user's true contact according to a second preset rule, and associate the virtual contact with the true contact.

For example, when the true contact and the virtual contact are a true contact telephone number of the user and a virtual contact telephone number, respectively, the contact processing unit 8022 is configured to set a call forwarding number for the virtual contact telephone number to be the true contact telephone number.

Further, when the virtual contact telephone number is a fixed telephone number or a mobile telephone number, the contact processing unit 8022 is configured to send a call forwarding instruction for a telephone exchange to set the call forwarding number for the virtual contact telephone number to be the true contact telephone number; and when the virtual contact telephone number is a network telephone number, the contact processing unit 8022 is configured to send a call forwarding instruction for an IM server or a VoIP server to set the call forwarding number for the virtual contact telephone number to be the true contact telephone number.

In one exemplary embodiment, the contact processing unit 8022 is configured to disassociate the virtual contact from the true contact when receiving a confirmation by the user of receipt of a delivery. For example, the contact processing unit 8022 may cancel the call forwarding setting of the virtual contact telephone number.

In addition, when the virtual contact telephone number is the fixed telephone number or the mobile telephone number, the contact processing unit 8022 is configured to send an instruction for releasing the call forwarding, for the telephone exchange to cancel the call forwarding setting of the virtual contact telephone number; and when the virtual contact telephone number is the network telephone number, the contact processing unit 8022 is configured to send an instruction for releasing the call forwarding, for the IM server or the VoIP server to cancel the call forwarding setting of the virtual contact telephone number.

One of ordinary skill in the art will understand that the above described units can each be implemented by hardware, or software, a combination of hardware and software. One of ordinary skill in the art will also understand that the above described units may be combined as one unit, and each of the above described units may be further divided into a plurality of sub-units.

Figure 10:
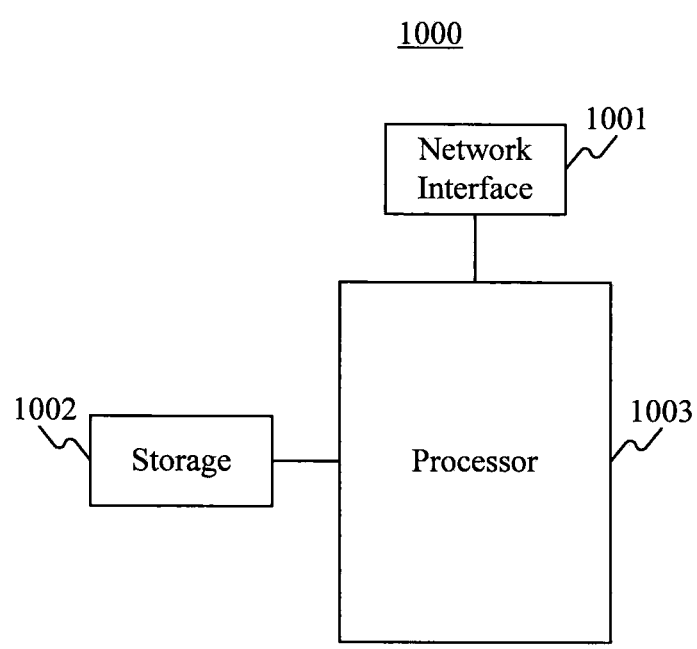
FIG. 10 is a block diagram of an apparatus for processing user information provided in online ordering, according to an exemplary embodiment.

FIG. 10 is a block diagram of an apparatus 1000 for processing user information provided in online ordering, according to an exemplary embodiment. For example, the apparatus 1000 may be a computer or a server configured to perform the above described methods for processing user information. Referring to FIG. 10, the apparatus 1000 includes a network interface 1001, a storage 1002, and a processor 1003. The person skilled in the art will appreciate that the structure shown in FIG. 10 does not restrict the apparatus 1000, and the apparatus 1000 may include more or less components than the illustrated components, or may include some combinations of the components, or may include different arrangements of the components.

The storage 1002 is configured to store software programs and application modules, and the processor 1003 is configured to perform a variety of functional applications and data processing by running the software programs and application modules stored in the storage 1002. The storage 1002 may include a program storing area and a data storing area. The program storing area stores an operating system, an application program including instructions to perform the above described methods for processing user information, and the like. The data storing area stores data, such as generated anonymous information. Further, the storage 1002 may include a high-speed random access memory (RAM), or a non-volatile memory, such as a disk storage device, flash memory device, or other volatile solid-state memory devices.

The network interface 1001 is configured to receive instructions from the user.

The processor 1003 operates as a control center of the apparatus 1000, and connects to various components of the apparatus 1000 via various interfaces and lines. The processor 1003 is configured to execute the instructions stored in the storage 1002 to perform the above described methods for processing user information.

In exemplary embodiments, there is provided a non-transitory storage medium including instructions, such as included in the storage 1002, executable by the processor 1001 in the apparatus 1000, for performing the above described methods for processing user information. For example, the non-transitory storage medium may be a read-only storage, a magnetic disk, an optical disk, etc.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:
1. A method implemented by a first computer to generate an order for online ordering, comprising:
receiving user information provided in the online ordering, the user information including a true appellation and a true contact of a user;

generating a prompt regarding performing an anonymous process on the provided user information;
receiving an instruction to perform the anonymous process on user information selected from the provided user information, the selected user information including the true appellation and true contact of the user;
performing, in response to the instruction, the anonymous process on the selected user information, to obtain anonymous information corresponding to the selected user information, the anonymous process including:
  generating the anonymous information based on the selected user information; and
  establishing a corresponding relationship between the generated anonymous information and the selected user information;
wherein the performing of the anonymous process includes:
  generating a virtual appellation corresponding to the true appellation, the virtual appellation being unused with other orders; and
  generating a virtual contact unused with other orders, and associating the virtual contact with the true contact, the associating including:
    when the true contact and the virtual contact are a true contact telephone number of the user and a virtual contact telephone number, respectively, setting a call forwarding number for the virtual contact telephone number to be the true contact telephone number; and
generating an order containing the anonymous information in lieu of the selected user information,
wherein when a third party other than a user placing the order and a service provider generating the order makes a call to the virtual contact telephone number in the order, a second computer automatically forwards the call to the true contact telephone number, such that the third party can communicate with the user,
wherein when the virtual contact telephone number is a network telephone number, the second computer is an instant messenger (IM) server or a voice over Internet protocol (VoIP) server, and the setting of the call forwarding number includes sending a call forwarding instruction for the IM server or VoIP server to set the call forwarding number for the virtual contact telephone number to be the true contact telephone number of the user.

2. The method according to claim 1, further comprising:
providing the generated order to the third party.

3. The method according to claim 1, wherein when the virtual contact telephone number is a fixed telephone number or a mobile telephone number, the setting of the call forwarding number comprises:
  sending a call forwarding instruction for a telephone exchange to set the call forwarding number for the virtual contact telephone number to be the true contact telephone number of the user.

4. The method according to claim 1, further comprising:
  after receiving a confirmation by the user of receiving a delivery, disassociating the virtual contact from the true contact.

5. An apparatus for generating an order for online ordering, comprising:
  a processor; and
  a storage for storing instructions executable by the processor;
wherein the processor is configured to execute the instructions to:
  receive user information provided in the online ordering, the user information including a true appellation and a true contact of a user;
  generate a prompt regarding performing an anonymous process on the provided user information;
  receive a process instruction to perform the anonymous process on user information selected from the provided user information, the selected user information including the true appellation and true contact of the user;
  perform, in response to the process instruction, the anonymous process on the selected user information, to obtain anonymous information corresponding to the selected user information, the anonymous process including:
    generating the anonymous information based on the selected user information; and
    establishing a corresponding relationship between the generated anonymous information and the selected user information;
  wherein the performing of the anonymous process includes:
    generating a virtual appellation corresponding to the true appellation, the virtual appellation being unused with other orders; and
    generating a virtual contact unused with other orders, and associating the virtual contact with the true contact, the associating including:
      when the true contact and the virtual contact are a true contact telephone number of the user and a virtual contact telephone number, respectively, setting a call forwarding number for the virtual contact telephone number to be the true contact telephone number; and
  generate an order containing the obtained anonymous information in lieu of the selected user information,
  wherein when a third party other than a user placing the order and a service provider generating the order makes a call to the virtual contact telephone number in the order, a computer automatically forwards the call to the true contact telephone number, such that the third party can communicate with the user,
  wherein when the virtual contact telephone number is a network telephone number, the computer is an instant messenger (IM) server or a voice over Internet protocol (VoIP) server, and the processor is further configured to execute the instructions to send a call forwarding instruction for the IM server or VoIP server to set the call forwarding number for the virtual contact telephone number to be the true contact telephone number of the user.

6. The apparatus according to claim 5, wherein the processor is further configured to:
  provide the generated order to the third party.

7. The apparatus according to claim 5, wherein when the virtual contact telephone number is a fixed telephone number or a mobile telephone number, the processor is further configured to execute the instructions to:
  send a call forwarding instruction for a telephone exchange to set the call forwarding number for the virtual contact telephone number to be the true contact telephone number.

8. The apparatus according to claim 5, wherein the processor is further configured to execute the instructions to:
  disassociate the virtual contact from the true contact after receiving a confirmation by the user of receiving a delivery.

9. A non-transitory storage medium having stored therein instructions that, when executed by a processor of an apparatus, cause the apparatus to perform a method for generating an order for online ordering, the method comprising:

receiving user information provided in the online ordering, the user information including a true appellation and a true contact of a user;

generating a prompt regarding performing an anonymous process on the provided user information;

receiving an instruction to perform the anonymous process on user information selected from the provided user information, the selected user information including the true appellation and true contact of the user;

performing, in response to the instruction, the anonymous process on the selected user information, to obtain anonymous information corresponding to the selected user information, the anonymous process including:

generating the anonymous information based on the selected user information; and establishing a corresponding relationship between the generated anonymous information and the selected user information;

wherein the performing of the anonymous process includes:

generating a virtual appellation corresponding to the true appellation, the virtual appellation being unused with other orders; and generating a virtual contact unused with other orders, and associating the virtual contact with the true contact, the associating including:

when the true contact and the virtual contact are a true contact telephone number of the user and a virtual contact telephone number, respectively, setting a call forwarding number for the virtual contact telephone number to be the true contact telephone number; and generating an order containing the obtained anonymous information in lieu of the selected user information, wherein when a third party other than a user placing the order and a service provider generating the order makes a call to the virtual contact telephone number in the order, a computer automatically forwards the call to the true contact telephone number, such that the third party can communicate with the user, wherein when the virtual contact telephone number is a network telephone number, the computer is an instant messenger (IM) server or a voice over Internet protocol (VoIP) server, and the setting of the call forwarding number includes sending a call forwarding instruction for the IM server or VoIP server to set the call forwarding number for the virtual contact telephone number to be the true contact telephone number of the user.

10. The non-transitory storage medium according to claim 9, the method further comprising:

providing the generated order to the third party.

* * * * *